… … …

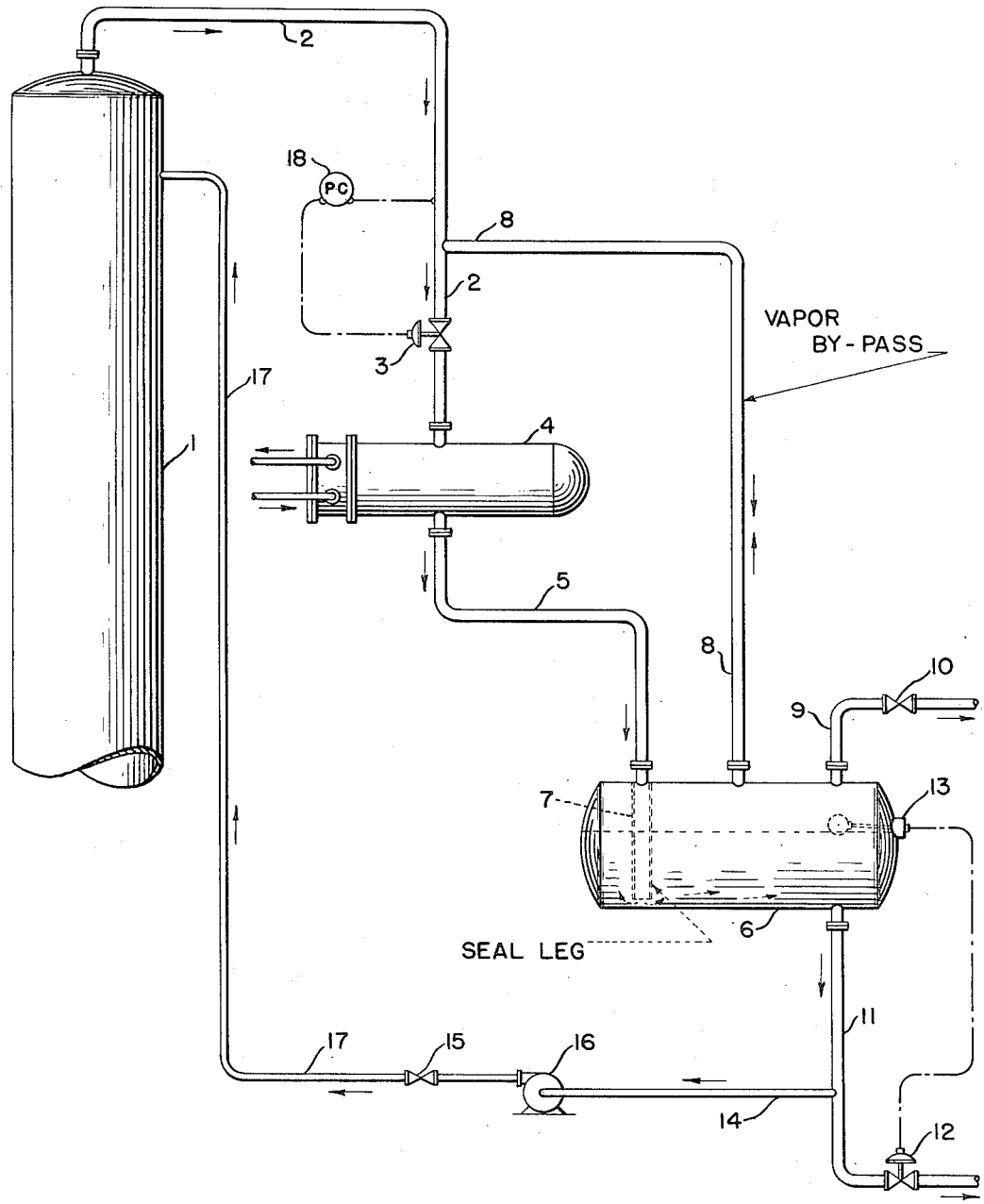

United States Patent Office 2,711,992
Patented June 28, 1955

2,711,992

MEANS FOR CONTROLLING PRESSURE IN A COLUMN HAVING TOTAL CONDENSING VAPORS

Charles W. Kerner, Berwyn, Ill., assignor to Universal Oil Products Company, Chicago, Ill., a corporation of Delaware Application June 16, 1951, Serial No. 232,028

5 Claims. (Cl. 202—160)

This invention relates to an improved automatic method and means for controlling pressure on vaporizing columns, such as fractionating, distilling columns and the like, and for effecting the recovery of condensate therefrom. This invention is also particularly directed to a pressure control system for columns having total condensing vapors and having connecting therewith a vapor cooler or condenser which is at a higher elevation than the receiving chamber.

Usual arrangements for condensing overhead vapors and effecting the recovery of condensate from a column do not provide means for maintaining the same pressure in the receiver as is maintained in the top of the column. For example, one arrangement may have a control valve placed in the vapor line from the column to the condenser to regulate vapor flow and resulting condensate flows directly into the receiving chamber. However, this type of condensing system does not operate in an efficient manner, for in general, the receiver and condenser operate at a pressure considerably lower than the column pressure depending of course upon the vapor pressure of the particular material being condensed and related condensing conditions. A low or reduced pressure operation for the condenser means that it cannot work at its maximum efficiency and as a result a much larger size condenser is necessary in each installation than would be required by an arrangement providing a higher pressure operation for condensing the same material.

It is a principal object of the present invention to utilize a pressure controlled valve in the main vapor line from the column to the condenser, and to maintain the same pressure in the top of the receiver chamber as that in the top of the column by the use of a modified arrangement of a pressure control and recovery system, whereby there is more efficient operation of the vapor condenser as well as a fast response to pressure variations in the system.

It is a further object of the present invention to provide a pressure control system and a condensate recovery arrangement which maintains the same pressure in the upper portion of the receiving chamber as maintained in the vaporizing column by the use of a by-pass line, and a liquid level in the receiver effecting a seal on the condenser outlet line.

The present improvement not only provides resulting advantages in the operation of the condensing system, but aids accompanying apparatus, as for example, by increasing the pressure in the receiver to aid the condensate pumps, and to thus reduce the size and cost of the pumping units.

Briefly, the present invention provides in a pressure control system column having total condensing vapors and a vapor condensing zone which is positioned at a higher elevation than the condensate receiving zone, the improved method of maintaining a pressure control on the column and recovering condensate which comprises, passing the vapors from the column to a cooling and condensing zone at a regulated flow responsive to the pressure of the vapor stream, condensing the vapors in the cooling zone and passing the resulting condensate in a confined channel to a level below the liquid level maintained within the lower elevation condensate receiving zone, and maintaining vapor communication and pressure equalization between the upper portion of the column and the condensate receiving zone, whereby the condensing zone operates at a slightly lower pressure than the vapor pressure from the column and condensate maintains a liquid seal between the receiving zone and the cooling zone.

In still another embodiment, the present invention provides apparatus for recovering condensate and controlling pressure on a column having total condensing vapors and having a vapor condenser positioned at a higher elevation than the condensate receiver, the improved apparatus arrangement comprising in combination, a vapor conduit from the upper portion of the column connecting with the vapor condenser, a pressure controller and an adjustable flow control valve connecting therewith positioned within the vapor conduit, a condensate conduit connecting the lower portion of the condenser with the lower portion of the condensate receiver and maintaining a liquid seal between said receiver and said condenser, a vapor by-pass conduit extending between the upper portion of the condensate receiver and the vapor column, with said by-pass conduit communicating with the column upstream from the pressure control valve and holding column pressure within the receiver above the liquid level therein, whereby column pressure within the upper portion of said receiving chamber regulates the condensate flow from the condenser through the liquid seal to the receiver.

In a preferable arrangement, the pressure controller and control valve in the main vapor line to the condenser is positioned just ahead of the latter and the vapor by-pass line from the upper portion of the liquid receiver connects with the main vapor line just upstream from the control valve. Thus, in the usual unit or condensing system, shorter lines or conduits may be used and a compact arrangement is provided. The condensate conduit connecting the lower end of the condenser with the liquid receiver may be arranged so that the line connects with the bottom portion of the receiver chamber at a zone or level below the normal liquid level in the chamber, or alternatively, a sealed leg may be passed downwardly through the receiving chamber so that a liquid seal is always maintained in the condensate conduit.

In addition to the fact that a fractionating, distilling column, or other type of vaporizing column will obtain a more rapid response to the dictates of the pressure controller and control valve positioned in the main vapor line to the condenser, there are additional advantages which the present pressure control and vapor recovery system provides. For example, holding a liquid level in the condenser permits the latter to operate at varying pressures which are only slightly below the operating pressure of the column, and this in turn allows the condenser to operate at maximum condensing efficiency, permitting minimum sizes and low initial expense. Where condensate is held in the body of the condenser, there is "sub-cooling," that is greater cooling of the condensate, and resulting better conditions for the pumping units, in that the net position suction head required for the pumps is reduced. Also, the condensate conduit connection with the receiving chamber and the suction connection for the condensate pump may be arranged so that there is a flow of the sub-cooled condensate across the bottom of the receiving chamber and the top surface of the liquid level in the latter is maintained relatively stagnate. The stagnate condition of the surface of the liquid in the receiving chamber permits the formation of a shallow layer of a relatively warm condensate and in turn protects against the loss of sub-cooling to the vapor blanket in the upper portion of the receiving chamber. Still further, the operation of the receiving chamber at a higher pressure reduces the load on the column reflux pump and thereby effects a savings in the cost of the pump and its driving unit.

Reference to the accompanying drawing and the following description thereof will serve to clarify the operation of the improved pressure control and vapor recovery system of this invention, as well as point out further advantages obtained in utilizing this modified arrangement.

Referring now to the drawing, there is indicated a fractionating or distilling column 1 having vapors passing overhead through vapor conduit 2 for subsequent condensation and recovery. Column 1 may, for example, be a debutanizer column such as utilized in a gas recovery system of a refinery, where a gasoline stream may be freed of butane and lighter materials to provide a debutanized gasoline stock. The vapors from line 2 pass downwardly through an adjustable valve 3 to a suitable condenser 4, with flow being regulated through valve 3 by means of an automatic pressure controller indicated as 18. The latter connects with vapor conduit 2 and with the control valve 3 or controller 18 may connect with the top of column 1. Resulting condensate from the condenser 4 passes down through a condensate line 5 to receiver 6, and in accordance with the present invention, the liquid from conduit 5 is passed downwardly through a seal leg 7 to the lower portion of the receiving chamber 6 and at a point below the liquid level of the receiving tank, in order that a liquid seal be maintained.

A by-pass conduit 8 connects the upper portion of the receiver 6 with the vapor conduit 2 and thus permits the column pressure to be maintained in the upper portion of the receiving chamber 6. The vapor by-pass conduit may of course connect directly with the upper portion of the column 1, however, in a preferred arrangement the conduit 8 connects directly with the conduit 2 at a point upstream of the control valve 3. An uncondensed vapor or vent gas line 9 with valve 10 connects with the upper portion of the receiver tank 6 so that undesired gases may be removed from the system. A condensate outlet line 11 and control valve 12 provided for the continuous removal of condensate, providing means for passing the liquid to storage or to other desired equipment. A suitable level control means 13 is indicated as providing a substantially unchanging desired liquid level within receiving chamber 6, with the level controller in turn connecting with control valve 12 in order to regulate flow from the chamber 6. A reflux withdrawal line 14 connects with the condensate withdrawal line 11 and passes a portion of the condensate stream through pump 16 and line 17, having valve 15, to the upper portion of column 1 in a substantially conventional arrangement.

The installation of the pressure controller 18 and the control valve 3 in the main vapor line 2 leading to the condenser 4 effects an operation wherein the control valve for vapor flow contains a more rapid response to the variations in column pressure. However, upon variations in vapor flow from column 1 to the condenser 4, there may be some unstable effects in the recovery system beyond the control valve and condenser 4 unless an arrangement such as provided by the present invention is made. The vapor by-pass as provided by conduit 8, holds an operating pressure in the upper portion of the receiving chamber 6 substantially equal to that in the upper portion of column 1, and thus stabilizes the operating pressure of the receiver itself.

While the vapor by-pass conduit 8 holds the operating pressure within the upper portion of the receiving chamber 6, the same as that in column 1, the seal leg 7 provides a liquid seal on the outlet of the condensate conduit 5 and permits the condenser 4 to operate at a varying pressure slightly below that of the operating pressure of the column itself. The column pressure in the upper portion of the receiver and on the top of the liquid level therein also tends to regulate the flow of the condensate from condenser 4 into the lower portion of receiver 6, even in some instances, to the extent of returning some of the condensate from the receiver 6 back up into the leg 7 and conduit 5. This arrangement permits the condenser to automatically adjust itself to the variations and duties as dictated by the flow of vapors through the pressure control valve 3 and at the same time operating conditions throughout the entire pressure control and recovery system are stabilized.

In some instances, the liquid level may back up and be maintained actually within condenser 4 so that condensate is cooled to a greater extent than it would be if resulting condensate passed immediately downwardly through outlet conduit 5 and into receiver 6. In other words, the condensate may be substantially sub-cooled with resulting desirable advantageous effects, such as reducing the net positive suction head requirements on the condensate pump. The lower temperature of the condensate and the higher pressure head, as provided by the higher liquid level up through condensate conduit 5, provides better suction conditions for the pumping units withdrawing the condensate. Also, the higher pressure maintained on the receiver reduces the duty of the column reflux pump 16, as well as a product pump, which is not shown, but serves to pump the condensate passing through conduit 11. The reduced duty on the condensate pumps effects a savings in the cost of the pumps and their driving units, and accompanying savings in water and power utilities.

The improved arrangement also permits the condenser to operate at the highest pressure possible, thus under optimum conditions, so that the size and cost of this unit may be also reduced. As briefly noted hereinbefore, the condensate is actually discharged into the lower portion of receiver chamber 6 and in a preferred arrangement flows across the lower portion of the chamber to a lower connecting condensate outlet such as conduit 11. Thus, there is a constant flow of the cooled condensate across the bottom of the receiver and the top surface of the liquid therein is held relatively stagnate and unmoving. The upper surface of the liquid level within receiver 6 becomes relatively warm and the cooler condensate entering and leaving the lower portion of the chamber is prevented from coming in contact with the vapor blanket within the upper portion of the receiving chamber 6.

As also noted, hereinbefore, minor variations may be made in the arrangement, as for example, the condensate conduit 5 from the higher positioned condenser 4, may connect directly with the lower portion of receiver chamber 6 in a manner which eliminates the use of the internal seal leg 7. In order words, the liquid seal is maintained entirely within the condensate conduit 5 by having the outlet of the latter connect with the lower end of receiver 6 at a point which is always below the liquid level maintained therein. Further, it is not intended to limit the present improved pressure control and recovery system to the use of any one type of fractionating or distillation column, however, the present arrangement is particularly adapted for use with those columns which have substantially all of the overhead vapors being condensed and recovered as a liquid condensate.

I claim as my invention:

1. In a pressure control system for a column having total condensing vapors and a vapor condenser positioned at a higher elevation than a condensate receiver, the improved method of maintaining pressure control on said column and condensing vapors, which comprises, passing vapors from said column to a cooling and condensing zone at a regulated flow responsive to the pressure of the vapor stream issuing from the column, cooling and condensing said vapors in said condensing zone and passing resulting condensate in a confined channel to said condensate receiving zone and maintaining a liquid seal between said condensing and receiving zones, and maintaining a vapor by-pass around said condensing zone to equalize pressure between the upper portion of said column and said condensate receiving zone.

2. Apparatus for recovering condensate and controlling pressure on a column having total condensing vapors and having connecting therewith a vapor condenser positioned at a higher elevation than a condensate receiver, comprising in combination, a vapor conduit from the upper portion of said column connecting with said condenser, a pressure regulated flow control valve within said conduit, a condensate conduit connecting the lower portion of said condenser with the lower portion of said condensate receiver and having a seal leg in the receiver, a vapor by-pass conduit connecting between the upper portion of said condensate receiver and said column, said by-pass conduit around said condenser and holding column pressure within said receiver above the liquid level maintained therein, and maintaining a maximum pressure within said vapor condenser.

3. Apparatus for recovering condensate and controlling pressure on a column having total condensing vapors and having connecting therewith a vapor condenser positioned at a higher elevation than a condensate receiver and comprising in combination, a vapor conduit from the upper portion of said column connecting with said condenser, a pressure controller connecting with said vapor conduit, an adjustable pressure regulated control valve in said vapor conduit and said valve connecting with said pressure controller, a condensate conduit connecting the lower portion of said condenser with the lower portion of said condensate receiver and having a seal leg in the receiver, a vapor by-pass conduit around said condenser and connecting between the upper portion of said condensate receiver and said vapor conduit upstream from the position of said flow control valve, said by-pass conduit holding column pressure within the upper portion of said receiver above the liquid level maintained therein and maintaining a maximum pressure within said vapor condenser.

4. The apparatus of claim 3 further characterized in that said seal leg extends downwardly through and to within a short distance of the bottom of said condensate receiver in a manner maintaining a liquid seal on said condensate conduit, and liquid level control means connects with said condensate receiver in a manner maintaining a substantially constant liquid level therein.

5. In combination with a vaporizing column, a vapor condenser and a condensate receiver at a lower elevation than the condenser, a vapor conduit connecting the upper portion of the column with the condenser, a flow control valve in said conduit, a condensate conduit connecting the lower portion of the condenser with the lower portion of the receiver and having a seal leg in the receiver, and a vapor by-pass conduit around the condenser and connecting the upper portion of the receiver with said vapor conduit at a point in the latter between said valve and the upper portion of the column.

References Cited in the file of this patent

UNITED STATES PATENTS

| | | |
|---|---|---|
| 1,541,227 | Kelly | June 9, 1925 |
| 2,026,019 | Carney | Dec. 31, 1935 |
| 2,086,808 | Kallam | July 13, 1937 |
| 2,260,111 | Caldwell | Oct. 21, 1941 |
| 2,350,006 | Wolfner | May 30, 1944 |
| 2,388,931 | Nelson | Nov. 13, 1945 |
| 2,415,411 | Bowman | Feb. 11, 1947 |
| 2,419,042 | Todd | Apr. 15, 1947 |
| 2,425,752 | McKenna et al. | Aug. 19, 1947 |
| 2,456,398 | Gerhold | Dec. 14, 1948 |
| 2,489,949 | Blair | Nov. 29, 1949 |
| 2,537,942 | Martin | Jan. 9, 1951 |
| 2,542,187 | Fulton | Feb. 20, 1951 |